United States Patent

[11] 3,578,159

[72] Inventors Everet F. Lindquist;
 George E. Carsner, Iowa City, Iowa
[21] Appl. No. 800,110
[22] Filed Feb. 18, 1969
[45] Patented May 11, 1971
[73] Assignee Westinghouse Learning Corporation

[54] DOCUMENT-HANDLING APPARATUS
 13 Claims, 10 Drawing Figs.
[52] U.S. Cl. .................................................... 209/74,
 271/87
[51] Int. Cl. .................................................. B07c 5/00
[50] Field of Search ........................................ 209/72, 74;
 271/86, 87, 88

[56] References Cited
 UNITED STATES PATENTS
 3,052,467 9/1962 Fertig ........................... 271/87(X)
 3,118,664 1/1964 Fux ............................. 271/87

*Primary Examiner*—Richard A. Schacher
*Assistant Examiner*—Gene A. Church
*Attorneys*—James C. Nemmers and Haven E. Simmons ABSTRACT: An arrangement for identifying particular documents, which are selected according to predetermined criteria, from other documents contained in a stack at the output end of an apparatus through which the documents were separately conveyed for processing or other purposes. The arrangement permits immediate identification in the output stack of the documents so selected without physically removing them from the stack and without disturbing the order of the documents as originally fed to the apparatus.

Patented May 11, 1971

INVENTORS
EVERET F. LINDQUIST
GEORGE E. CARSNER

BY

ATTORNEY

INVENTORS
EVERET F. LINDQUIST
GEORGE E. CARSNER
BY
*James C. Nemmers*
ATTORNEY

DOCUMENT-HANDLING APPARATUS

BACKGROUND OF THE INVENTION

There are known in the prior art a number of different machines used for a variety of purposes but which all have in common the functions of handling documents individually fed to the machine from an input document stack and discharging and restacking them at the output end. A common type of such machines are printing presses, and document or card "readers." It is often desirable in such machines to be able to quickly identify selected documents in the output stack without physically separating the selected documents from the stack. In printing presses, for example, it is often desirable to identity certain groups or sets of documents or to readily identify a fixed number of sheets in each group or set. In document readers, it is generally desirable to identify so-called "command" or "header" sheets which precede sets of documents of different types which may require different processing. In the prior art, machines are known which will eject a card transversely of its path of movement into a separate stack. In most types of processing, however, it is essential that all the documents remain as a part of the output stack and in the same order that they existed in the input stack. The prior art does not disclose any satisfactory arrangement by which particular documents which are selected according to predetermined criteria can be later readily identified in the output stack.

SUMMARY OF THE INVENTION

In applicants' invention, preprinted codes on selected documents are "read" by an optical scanner and are identified to the associated control device. If the predetermined criteria are met, the control device will send a signal to the output-stacking mechanism, and in proper timed relation to the selected document this signal will operate an offsetting vane so that the selected document will be offset in one direction from the normal position of the documents in the output stack. Selection of the documents to be offset in the output stack can be accomplished by preprinted code, or if the selected document follows a preselected number of other documents, an appropriate counting system can be employed. The invention permits the offsetting to be done at the location of the output document stacker even though this may be considerably remote from the location where the selection of the document to be offset was made. Since apparatus which handle documents often operate at a speed which varies over a wide range, and also handle documents of different size, apparatus employing the principles of the invention will operate to accurately offset selected documents at any speed or as the speed of the apparatus varies, and will also handle any document size within the limitations of the apparatus itself.

BRIEF DESCRIPTION OF THE DRAWINGS

The objects, features and advantages of the invention will become apparent from a description of the preferred embodiment herein taken in connection with the drawings in which.

DESCRIPTION OF THE PREFERRED EMBODIMENT

Figure 1:
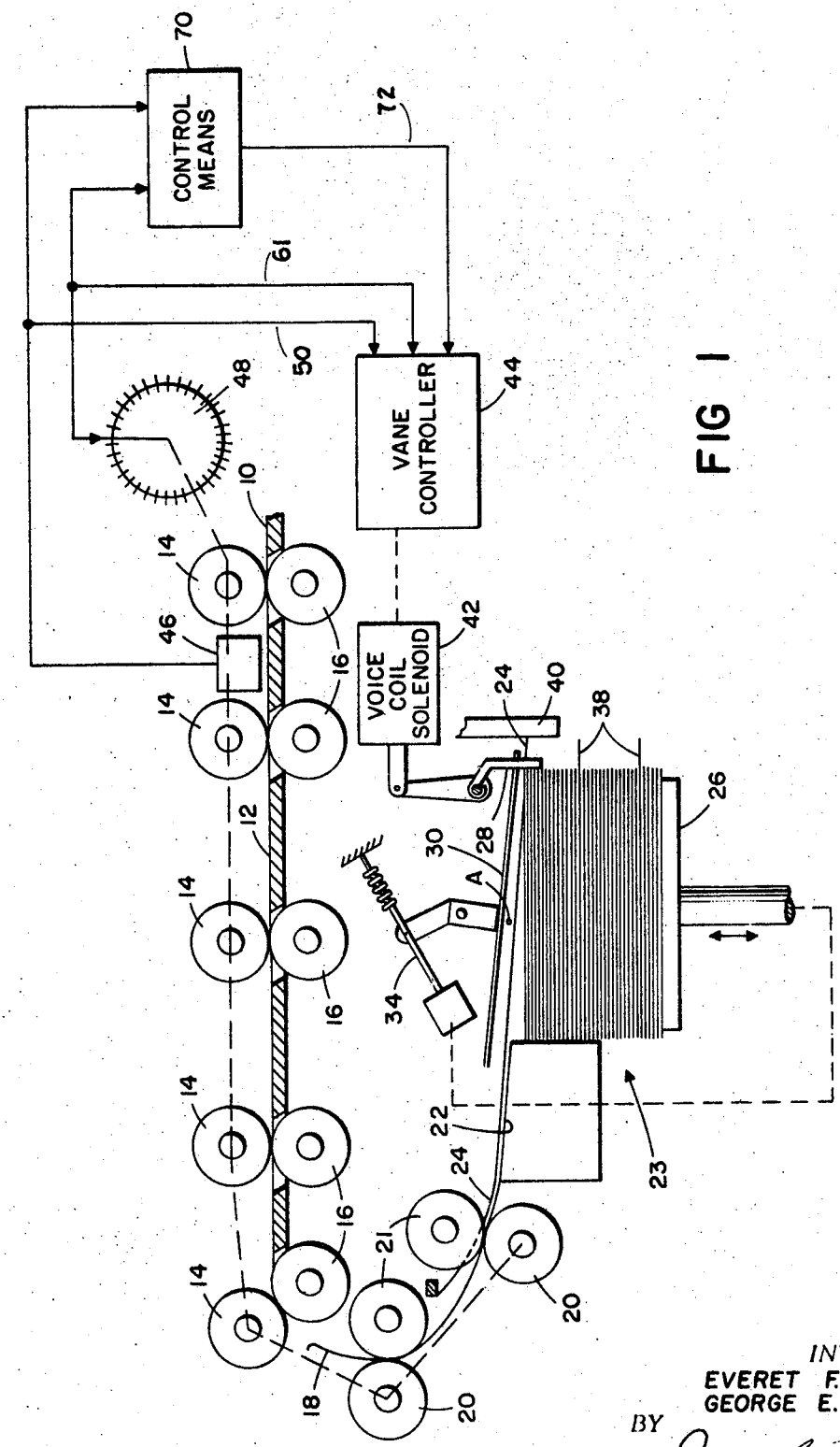
FIG. 1 is a fragmentary side elevation view of the output end of an apparatus embodying the invention part of the system being shown diagrammatically

Referring to FIG. 1, there is illustrated the output end of the document handling portion of an apparatus for "reading" documents. The documents passing through the apparatus are carried on a table 10 that provides a document-supporting surface 12. The documents are moved along the supporting surface 12 by a plurality of upper document drive wheels 14 located above the surface 12 and lower idler wheels 16 which are positioned in openings in the table 10 immediately beneath wheels 14. A pair of wheels 14 and 16 engages a portion of the document at all times so that a document is advanced positively from right to left of FIG. 1. The pairs of wheels 14 and 16 are, therefore, spaced according to the size of the document being handled. The documents are separately passed across the supporting surface 12, being fed individually onto the document-supporting surface 12 by any one of several feed systems well known to those skilled in the art, or by, for example, a feeding system such as that shown in the copending application Everett F. Lindquist filed Sept. 21, 1967, for "Document Feeding Mechanism," Ser. No. 669,457, now U.S. Pat. No. 3,485,489. However, the mechanism for feeding the documents onto the document-supporting surface 12 forms no part of the invention herein.

A document fed onto the supporting surface 12 follows a path along the supporting surface that is determined by the succession of drive wheels 14 and 16 and a side guide surface (not shown) that is perpendicular to and extends along the table 10. However, in order for the original order of the documents to be maintained when stacked at the output end, the documents must be inverted prior to stacking. Thus, when a document leaves the supporting surface 12, its leading edge engages a curved turnover plate 18 and follows the path defined by said plate until the document is completely inverted. All during the time that the document is following the path defined by turnover plate 18, it is under positive control by engagement with drive wheels 20 and idler wheels 21.

The drive wheels 20 and the drive wheels 14 are preferably all mechanically interconnected and, therefore, driven at precisely the same speed. This is essential to maintain the accurate timing required in apparatus of this type.

Figure 2:
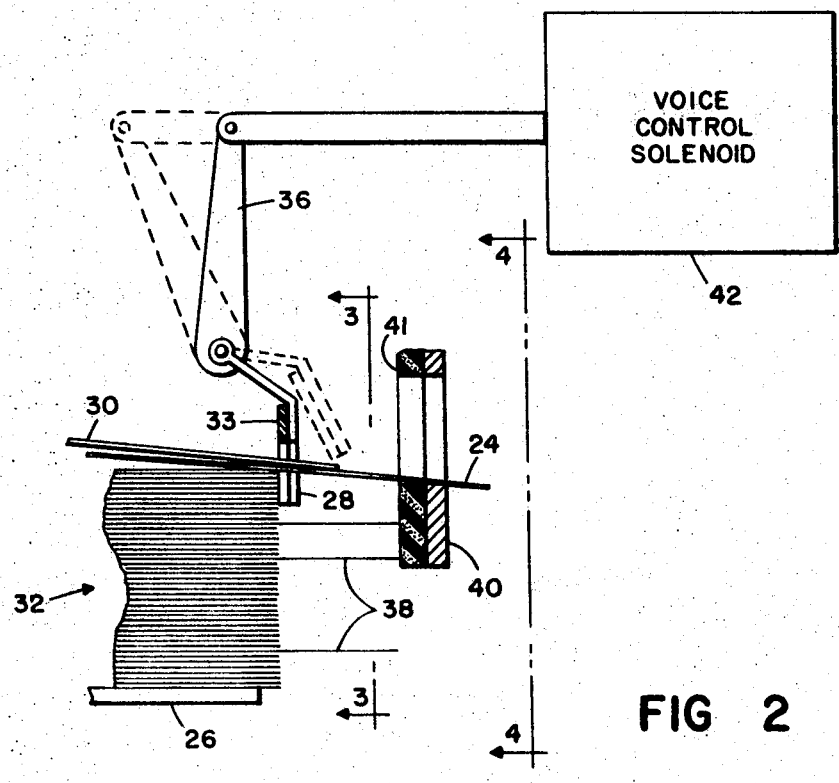
FIG. 2 is an enlarged side elevation view of a portion of the apparatus of FIG. 1 and showing in detail the offsetting mechanism.
Figure 3:
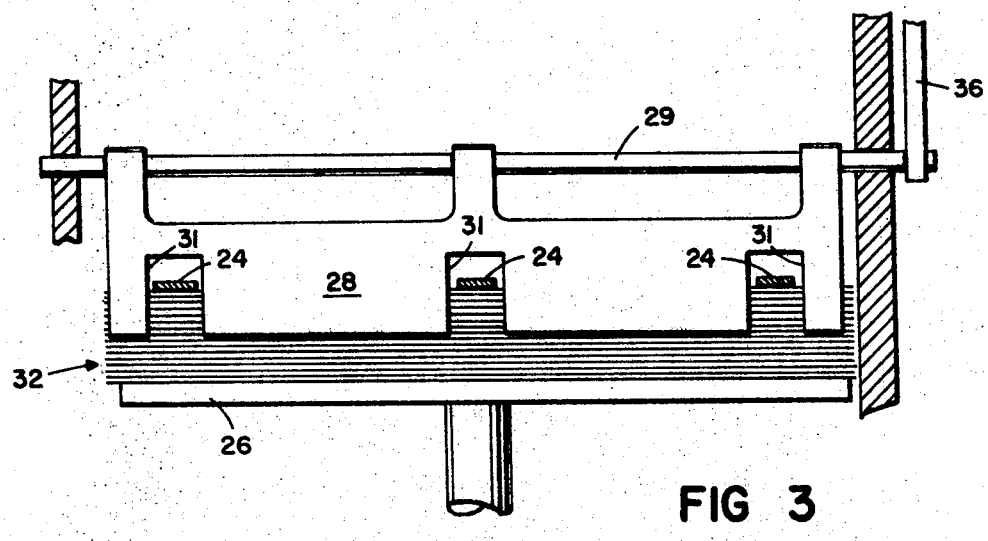
FIG. 3 is a sectional view taken on the line 3—3 of FIG. 2.
Figure 4:
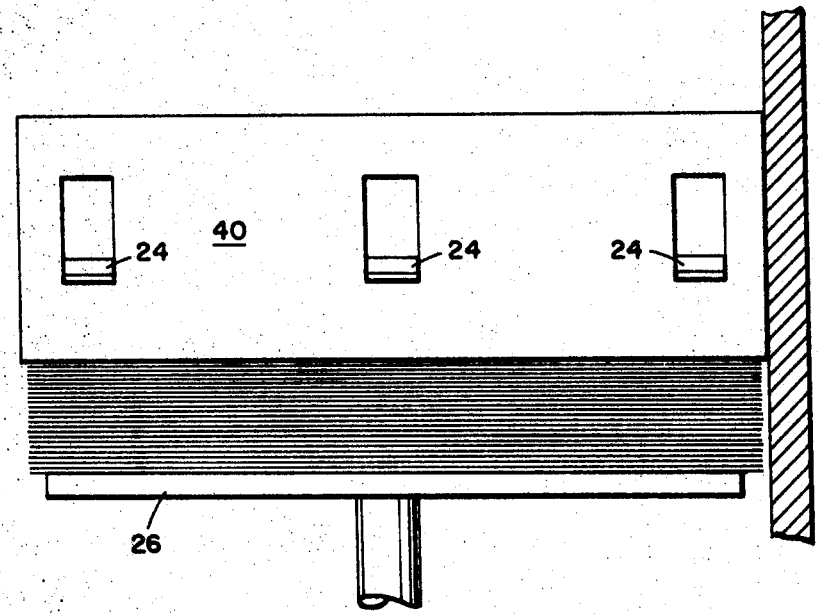
FIG. 4 is a sectional view taken on the line 4—4 of FIG. 2 and showing further details of the stacking mechanism.

A document which has completed its travel along the path defined by the turnover plate 18 and is, therefore, inverted will now be moving from left to right of FIG. 1. As the inverted document approaches the end of the path defined by turnover plate 18, it will rest on a lower supporting surface 22 and be guided between surface 22 and a plurality of holddown springs 24. As shown in FIG. 1, the holddown springs 24 extend from a point upstream from the last set of drive rollers 20 downstream across the top of the document stack support table 26. As the document continues to move to the right (FIG. 1) beneath the holddown springs 24, it will leave the positive control of the last set of wheels 20 and 21. The momentum of the document will continue to carry it to the right until it strikes an offsetting vane 28. The offsetting vane 28 extends across and above the front edge of the document support table 26 (See FIG. 3) and is pivotally mounted at its outer ends on rod 29. The vane 28 has a plurality of openings 31 through which extend the ends of holddown springs 24. The holddown springs 24 and a stack height sensor plate 30 exert a slight pressure on top of the document stack that produces frictional forces between the incoming document and the top of the document stack. These frictional forces assist in decelerating the incoming document. Preferably, however, the face of the offsetting vane 28 is covered with a suitable energy-absorbing material 33 (FIG. 2) to reduce any tendency for the document to bounce back. In the usual situation, the majority of the documents, after striking the offsetting vane 28, will come to rest on the top of the document stack 32 being formed on support table 26. The document stack supporting table 26 is movable up and down by any suitable means preferably having a hydraulic or pneumatic (not shown) cylinder that will move plate 26 through an infinite number of positions. Control of the movement of plate 26 is accomplished by appropriate means through the stack height sensor plate 30 and the stack height controlling mechanism 34. Further details of the stack height controlling system are not described herein since a variety of such systems are well known to those skilled in the art. For the purposes of this invention, however, it should be noted that as the height of the stack of documents on support table 26 increases, the increase will be sensed by sensor plate 30 and the document stack support table 26 lowered accordingly, so that the level of the top of the stack is maintained substantially the same within predetermined limits. The stack height controlling system should be regulated so that the distance between the top of the document stack and the holddown springs 24 is rather small. This minimizes any tendency for the document to buckle as it is decelerated to a stop. Moreover, as the document begins to enter its position on top of the document stack, the holddown springs 24 and lower supporting surface 22 are arranged so as to impart a slight curl to the document with the axis of the curl being in the direction of movement of the document. This obviously forms the document into a slight semicylindrical shape rather than a flat shape, and, therefore, greatly increase its rigidity and resistance to buckling. FIG. 3 shows the position of the three document holddown springs 24 and these springs are adjusted so as to assist in producing the "curling" effect on the document.

As previously indicated, the apparatus of the invention is designed to identify particular documents according to predetermined criteria. For example, data sheets are commonly processed through document readers in groups each of which may require difference processing treatment subsequently. These groups of documents are usually identified by "command" or "header" sheets which contain a preprinted code. Also, such readers commonly employ detection systems whereby an improperly marked document will be detected. Such documents must be identified for personal attention and review. The present invention can be used for identifying such documents as well as the precoded documents. The invention basically provides means whereby a document to be identified will be permitted to travel beyond the normal stopping point at output stack. This illustrated in FIG. 1 in which most of the documents in the documents stack 32 have their leading edges aligned whereas the documents indicated by the reference numeral 38 have their leading edges extending beyond the normal front edge of the stack 32. Offsetting of individual selected documents is achieved by raising the offsetting vane 28 when the leading edge of the document to be offset reaches point A, indicated in FIG. 1. The rod 29 to which vane 28 is affixed is connected to an operating lever 36 that is movable by a voice coil solenoid 42. When the appropriate signal is received by solenoid 42 (as described hereinafter) the lever 36 will be moved to the left (FIG. 2) thus raising the vane 28 as shown in the broken lines in FIG. 2. When the offset vane 28 is thus raised, the elected document is, therefore, allowed to move beyond the normal edge of the document stack 32 until it comes to rest against the offset stop 40, the face of which is also preferably provided with a suitable energy-absorbing material 41. After the selected document has been thus offset, the offsetting vane 28 will return to its normal position in which it serves as a stop for all documents other than those documents which are selected for identification by offsetting. The offsetting vane 28 will remain in its normal position until it is again raised by action of the solenoid 42.

Figure 5:
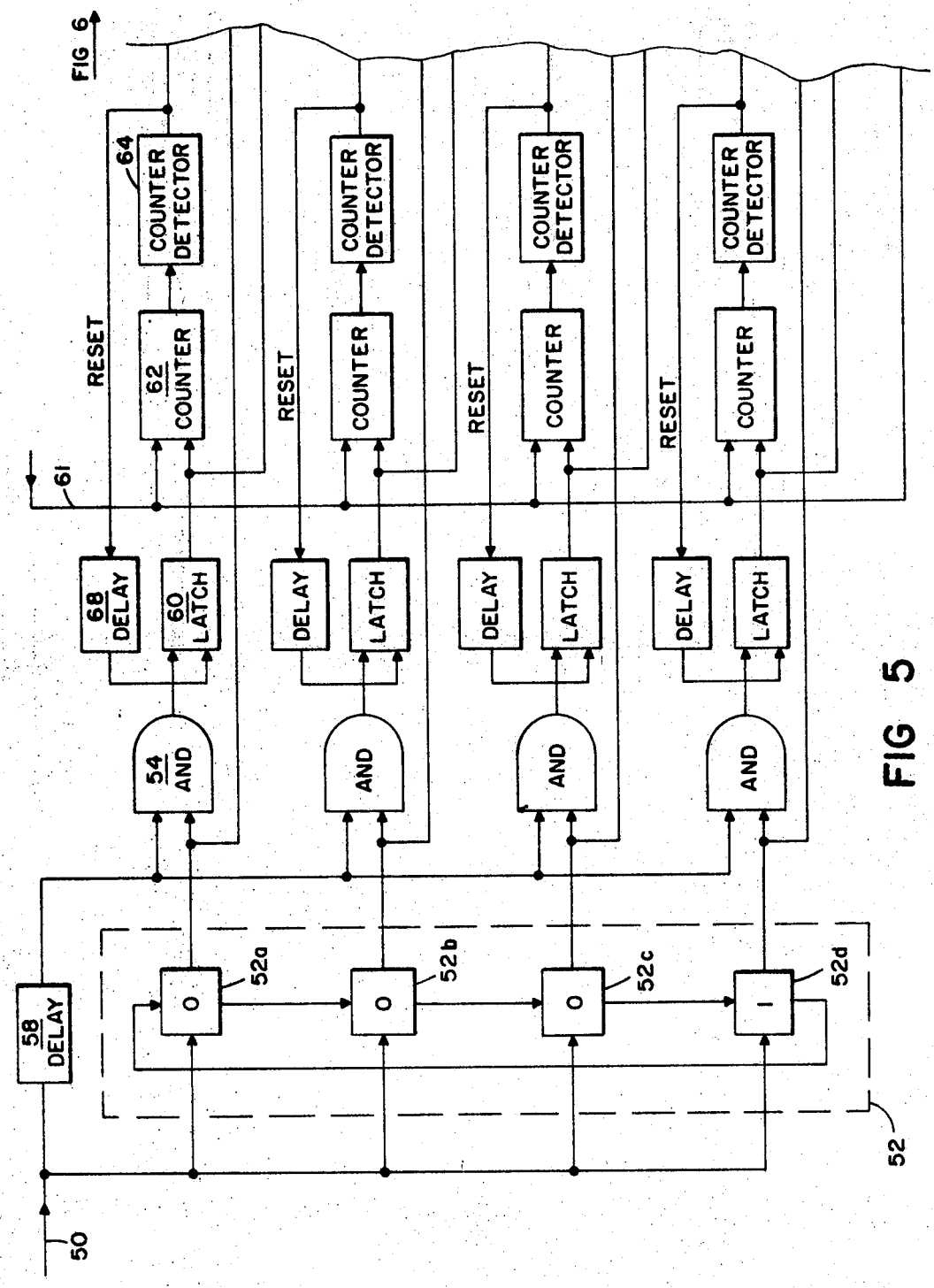
FIGS. 5 and 6 are a schematic diagram of circuitry for controlling the offsetting mechanism.
Figure 6:
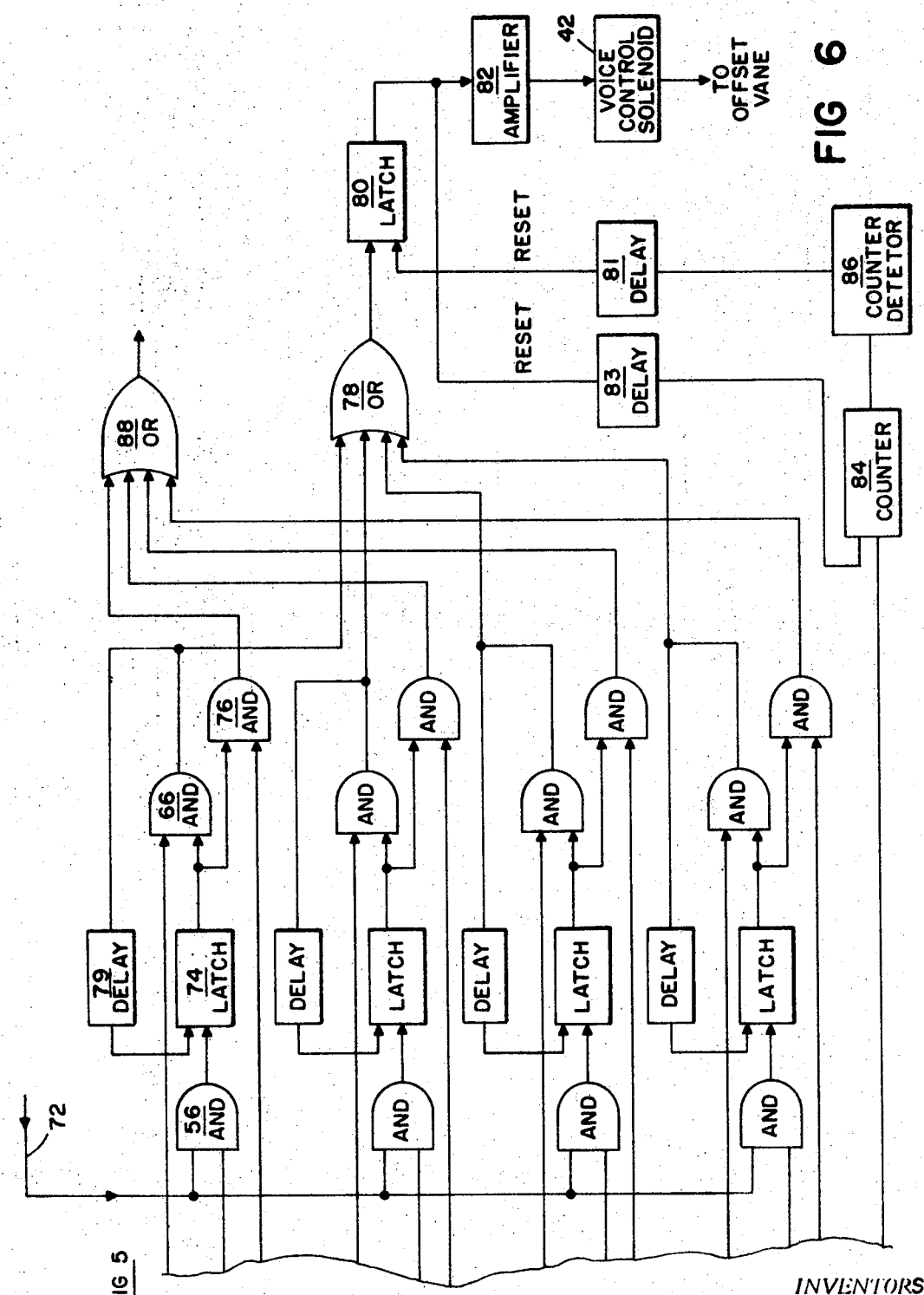

Solenoid 42 receives control signals from the offset vane controller which is indicated generally by the reference numeral 44. In FIGS. 5 and 6, there is shown a logic schematic for the offset vane controller 44, it being understood that this a preferred circuitry for accomplishing control of the offset vane 28 and that other suitable circuits might be employed. As previously indicated, the drive wheels 14 and 20 are all mechanically linked and driven at precisely the same speed, and the documents which are moved through the apparatus are, of course, moving at the same speed as the surface speed of these drive wheels. A reading head or other sensor 46 is located above the document-supporting surface 12 along the document path. Reading head 46 contains a sensor (not shown) such as a phototransistor which can optically detect the leading edge of each and every document passing beneath the reading head 46 and the document-supporting surface 12. Each and every document passing through the apparatus travels the exact same distance from the reading head 46 to point A of the output stack 32 since these points are fixed. Mechanically linked to the drive wheels 14 and 20 in any suitable manner is a pulse generator 48. Pulse generator 48 may be of any suitable type which will produce pulses at regularly spaced intervals at a constant rate. Since the drive wheels 14 and 20 are synchronized with the pulse generator 48, it is obvious that regardless of the speed at which any document is moving a fixed number of pulses will be emitted from the pulse generator 48 during the time that the document passes from the reading head 46 to point A of the output stack 32.

As the leading edge of the first document passes under the reading head 46, the lead edge sensor contained in the head 46 will generate an electrical pulse. Referring now to FIGS. 5 and 6, the circuitry for controlling the offset vane 28 is illustrated. The pulse from reading head 46 is fed to the input line 50 of the offset vane controller 44, and the signal generated by this pulse is applied to the binary shift register 52. The preferred embodiment described herein is one that is designed so that four documents can be accommodated end-to-end along the document support surface at one time. Thus, binary shift register 52 is a four-bit register, and FIGS. 5 and 6 show four control channels. It will be obvious to those skilled in the art that where smaller documents or a longer document-supporting surface is utilized, the throughput rate can be increased by increasing the length of the shift register 52 and the number of associated control channels to equal the number of documents which can occupy the document travel path at any one time. However, assuming that the apparatus is designed to accommodate four documents at one time, the signal on input line 50 will be applied to the four stages of the shift register 52 causing the contents of each of the storage cells 52a, 52b, 52c, and 52d to advance 1 stage in the direction indicated by the arrows. Thus, assuming that cell 52d has a 1 and the other three cells each contain an 0, the 1 will be advanced to cell 52a and each 0 will move down one cell upon receipt of the first signal on the input line 50. The cell of the register 52 containing a 1 provides a continuous output signal, and assuming the 1 has been shifted to cell a, a signal will be transmitted to one of the inputs of AND gate 54 and also to one of the inputs of AND gate 56 (FIG. 6). Through a delay 58 in a branch of input line 50 a signal will be provided to the other input of AND gate 54 which will then produce an output signal to latch 60 and turn it "on." The output of latch 60 allows counter 62 to begin counting pulses received from the pulse generator 48 on line 61. A counter detector 64 is set to a pulse count that is equivalent to the distance along the document path from the lead edge detector in reading head 46 to point A in the output stack 32. When the pulses from pulse generator 48 that are counted by counter 62 equal the set count of detector 64, the detector 64 produces a signal to AND gate 66 and through a delay 68 resets latch 60 to "off" and the counter 62 to 0.

As previously described, when the lead edge of a document passes beneath the reading head 46 a signal is produced on the input line 50. Almost simultaneously, read head 46 will scan and "read" a document to pick up, for example, any preprinted code which would indicate that the document ought to be separately identified and, therefore, offset in the output stack. The information "read" by reading head 46 is transmitted to a computer or other auxiliary control means 70 (FIG. 1) which can be of any suitable type that will receive such signals and produce an output signal if the input signal meets predetermined criteria programmed into the control means 70. Assuming that the control means 70 has sent an "offset" signal to the offset vane controller 44, this signal is received on line 72 (FIG. 6) and sent to one of the input lines to AND gate 56. If the signal from control means 50 (which indicates the lead edge of a second document has been detected) a signal from register 52 will still exist on the other input to AND gate 56 and said gate will produce an output signal to latch 74 and turn said latch "on." Latch 74 (when on)

will produce a continuous output signal to the other input line of AND gate 66 and also to one of the inputs to AND gate 76. At the precise time the lead edge of the document reaches point A of the document stack 32, the count in counter 62 will have equaled the preset count in detector 64 which will emit an output pulse to the other input of gate 66. Thus, gate 66 will produce an output pulse to an input of OR gate 78 and turn on latch 80. Latch 80 will then produce a continuous output signal to drive amplifier 82 which activates the voice coil solenoid 42 thereby moving the offsetting vane 28 to an "up" or offset position. The selected document, the lead edge of which is at or slightly past Point A of the document stack 32, will then move past the normal stack edge until it strikes the offset stop 40.

The output signal of gate 66 will also reset latch 74 through delay 79.

The offsetting vane 28 will remain in the up position just long enough to permit the selected document to bypass it and strike the offset stop 40. Since the documents may be traveling at speeds which vary over a wide range, and consequently the length of time the offsetting vane 28 must remain in its "up" position must also vary accordingly, we have devised an arrangement for controlling the "up time" of the offset vane 28 which will vary correspondingly to the rate of document travel. The "up time" of the offset vane 28 is controlled by a vane control counter 84 (FIG. 6) which receives the continuous series of pulses emitted from the pulse generator 48. As previously described, pulse generator 48 is synchronized with document drive wheels 14 and 20 and thus with the speed of the document. It will be recalled that the offset vane 28 will not be moved to its "up" position until the lead edge of the document reaches point A in the document stack 32 at which the output signal from latch 80 energizes the solenoid 42. This same output signal from latch 80 will be sent to start the counter 84. The counter 84 begins counting pulses from the pulses generator 48 just after the time that latch 80 is turned on to move the offset vane 28 to its "up" position. A counter detector 86 is preset to count equivalent to the distance required for the document to travel from point A to the offset stop 40. When the count in the vane control counter 84 equals the count of the preset counter detector 86, a pulse is emitted by detector 86 to the input of latch 80 to turn the latch "off" thereby deenergizing the voice coil solenoid 42 which allows the offset vane 28 to return to its "down" position. The reset pulse from detector 86 is preferably delayed slightly by delay 81 to assure that the document has reached stop 40. Also, when latch 80 is reset, the counter 84 is also reset to 0 ready for the next document that might require offsetting.

With this arrangement the "up time" of vane 28 will vary in direct relationship to the document speed so that it will be "up" just long enough to allow a selected document to be offset but will return to the "down" position in time to intercept the next document.

FIGS. 5 and 6 disclose four separate channels for activating the offset vane 28 through the voice coil solenoid 42. It should be evident from the above description with reference to the first channel that the other channels operate in the same manner, all of the said channels being arranged to emit a pulse to OR gate 78 in the event that a document is to be offset. As previously indicated, the number of channels required for the control circuit will be determined by the number of documents capable of being carried at any one time on the document-supporting surface between the reading head 46 and the document stack 32. Each channel will be activated serially by the shifting of the signal from cell to cell within the binary shift register 52 as the lead edge of a document is sensed by reading head 46 and a pulse transmitted through input line 50 to the binary shift register 52.

There is one error condition which can occur. Although occurrence of the condition is unlikely, we have provided for its occurrence in order to make the system self-correcting. It is possible that an offset signal from control means 70 could arrive too late to offset the proper document. In other words, the offset signal would not be emitted by the control means 70 until after the document to be identified had already come to rest in the normal position in stack 32. Assuming that this occurs and that a document which should have been identified has been passed through the system and has come to rest in the normal stack position, (and further assuming that the lead edge of the following document has not been detected so as to shift the signal within shift register 52) the cell 52a of the shift register 52 will still be supplying a signal to AND gate 56. If the too-late offset signal on line 72 from control means 70, then arrives at the other input of AND gate 56, the output signal emitted by gate 56 will turn latch 74 "on" thus providing a continuous signal to the upper input to AND gate 76. The polarity of the output of latch 60 is such that when it is set by AND gate 54 counter 62 will start counting, but the lower input to AND gate 76 will be inhibited. When delay 68 resets latch 60, counter 62 stops counting and is reset, but now the lower input to AND gate 76 is activated. Consequently, gate 76 will give an output pulse to OR gate 88, and the output signal of gate 88 can be used either to stop the machine or give an indication of an offset error. Obviously, since latch 60 is reset after the counting period which is equivalent to the lead edge of a document arriving at POINT A of the document stacker, if the offset signal is too late, the offsetting error will be indicated.

In the above description, it should be recognized that the described embodiment of the invention is such that four documents can be accommodated along the document supporting surface at one time and the proper offsetting determined according to the preset criteria. If the same apparatus is used to process documents which are shorter, the "throughput" rate of the apparatus can be increased by increasing the length of the shift register and the number of associated control channels so that the channels equal the number of documents which can occupy the document ravel path at one time between the sensor and the output stack. It will be further obvious to those skilled in the art that various revisions and modifications can be made to the preferred embodiment disclosed herein without departing from the spirit and scope of the invention. It is our intention, however, that all such revisions and modifications as are obvious to those skilled in the art will be included within the scope of the following claims:

We claim:

1. In a document-handling apparatus, means for identifying selected ones of documents handled by said apparatus and formed into a stack of documents, said means comprising document-conveying means for controllably moving documents individually along a defined path through said apparatus, sensing means for detecting the presence of a document at a selected point along said path, stacking means at the end of said path downstream from said sensing means for forming a stack of documents with their leading edges substantially aligned, control means responsive to said sensing means for allowing selected documents to continue movement in their direction of travel beyond the leading edge of said stack, and means for limiting said movement of said selected documents so that said documents remain a part of said stack.

2. In the document-handling apparatus of claim 1, in which said stacking means includes a stop means normally preventing movement of individual documents beyond the leading edge of said stack, and said control means is operatively combined with said stop means so as to move said stop means out of the path of an incoming document to an offset position and thereby allow selected documents to pass beyond said stop means.

3. In the document-handling apparatus of claim 2, in which said stacking apparatus includes a stack support and stack height control means to provide for movement of said stack support up and down so as to maintain the top of said document stack at substantially the same level at all times, said stop means being movable out of the path of a selected incoming document to allow the document to move onto the top of the stack, but beyond the leading edge of said stack.

4. In the document-handling apparatus of claim 2, in which said control means includes retard means for delaying the movement of said stop means a sufficient time after a selected document is detected by said sensing means to allow the selected document to travel from said sensing means to said stacking means.

5. In the document-handling apparatus of claim 4, in which said retard means is synchronized with the document speed of said conveying means so that the time delay of movement of said stop means will vary correspondingly with the speed of the documents along said path.

6. In the document-handling apparatus of claim 4, in which said control means includes a pulse generator operable in synchronism with said document-conveying means to continuously produce a train of pulses, a pulse counter operatively combined with said pulse generator and operable responsive to said sensing means to commence counting pulses from said generator upon detection of a lead edge of a document by said sensing means, a counter detector set to a count equivalent to the distance from said sensing means to a selected point upstream from said stop means, offset control means responsive to predetermined conditions to produce an offset signal, and means combined with said counter detector to control movement of said stop means out of the document path when said preset count has been attained and if an offset signal has been received from said offset control means.

7. In the document-handling apparatus of claim 6, in which said counter detector resets said pulse counter to zero when said preset count has been attained.

8. In the document-handling apparatus of claim 6, in which said control means includes error correction means that provides an error signal if said offset signal is received after a document selected for offsetting has come to rest with its leading edge aligned with said stack.

9. In the document-handling apparatus of claim 2, in which stop control means is provided to control the offset time of said stop means in accordance with the rate of document travel produced by said conveying means.

10. In the document-handling apparatus of claim 9, in which there is provided a pulse generator operable in synchronism with said document-conveying means to continuously produce a train of pulses, a pulse counter operatively combined with said pulse generator to count pulses produced thereby, said counter being responsive to a signal from said control means to start counting pulses at the time said stop means is moved to an offset position, a counter detector set a count equivalent to the distance required for a document to travel from a position just ahead of said stop means to an offset position, and means combined with said counter detector to return said stop means to a stop position when said preset count has been attained.

11. In the document-handling apparatus of claim 1 in which said control means is capable of serially controlling the number of documents that can be handled at one time by the document-conveying means between said sensing means and said stacking means.

12. A method of identifying selected documents from other documents that are conveyed individually along a path and then formed into a stack at the end of said path, said method comprising: Moving said documents individually along said path; forming said documents into a stack at the end of said path with their leading edges normally aligned; detecting the documents to be identified while the documents move past a selected point in said path; and allowing selected documents to travel slightly beyond said stack so that the leading edge of each of said selected documents extends beyond the edge of said stack.

13. The method of claim 12 including the steps of: providing a stop normally preventing movement of each of the documents along said path beyond a fixed point, thereby forming said stack; controllably withdrawing said stop to allow a selected document to move beyond said point; providing a second stop to limit the movement of said selected documents so that they remain a part of the stack; and returning said stop to a position stopping the documents from moving beyond said fixed point.